(12) United States Patent
Ott

(10) Patent No.: US 11,719,355 B2
(45) Date of Patent: Aug. 8, 2023

(54) METHOD FOR CONTROLLING A MAGNETIC VALVE AND METHOD FOR DISPENSING OR ASPIRATING A VOLUME OF LIQUID AS WELL AS CORRESPONDING DISPENSER/PIPETTING APPARATUS

(71) Applicant: TECAN TRADING AG, Mannedorf (CH)

(72) Inventor: Philipp Ott, Steg (CH)

(73) Assignee: TEGAN TRADING AG, Mannedorf (CH)

( * ) Notice: Subject to any disclaimer, the term of this patent is extended or adjusted under 35 U.S.C. 154(b) by 220 days.

(21) Appl. No.: 17/276,731

(22) PCT Filed: Sep. 20, 2019

(86) PCT No.: PCT/EP2019/075364
§ 371 (c)(1),
(2) Date: Mar. 16, 2021

(87) PCT Pub. No.: WO2020/064559
PCT Pub. Date: Apr. 2, 2020

(65) Prior Publication Data
US 2022/0034420 A1    Feb. 3, 2022

(30) Foreign Application Priority Data

Sep. 28, 2018  (EP) .................................. 18197661

(51) Int. Cl.
*F16K 37/00*  (2006.01)
*F16K 31/06*  (2006.01)
(Continued)

(52) U.S. Cl.
CPC ........ *F16K 31/0675* (2013.01); *B01L 3/0293* (2013.01); *F16K 37/0083* (2013.01);
(Continued)

(58) Field of Classification Search
CPC ............. F16K 31/0655; F16K 31/0675; F16K 37/0083; B01L 3/0293; B01L 2400/0666;
(Continued)

(56) References Cited

U.S. PATENT DOCUMENTS

| 1,538,906 | A | * | 5/1925 | Parisian | ................... | G01R 5/14 |
| | | | | | | 324/145 |
| 5,244,179 | A | * | 9/1993 | Wilson | ..................... | E03D 3/06 |
| | | | | | | 251/285 |

(Continued)

FOREIGN PATENT DOCUMENTS

| WO | 2007003583 | A1 | 1/2007 |
| WO | 2018091075 | A1 | 5/2018 |

OTHER PUBLICATIONS

International Search Report and Written Opinion for corresponding PCT application No. PCT/EP2019/075364, dated Dec. 20, 2019.

*Primary Examiner* — Matthew W Jellett
(74) *Attorney, Agent, or Firm* — Notaro, Michalos & Zaccaria P.C.

(57) ABSTRACT

A method for controlling a magnetic valve and particularly a method for dispensing and/or aspirating a volume of liquid as well as a corresponding dispenser/pipetting apparatus is disclosed. The method for controlling a magnetic valve has measuring a capacitance at the magnetic valve and determining a position of a plunger based on the measured capacitance. The method for dispensing or aspirating a volume of liquid has controlling a flow of a system fluid by a magnetic valve located between a pressure source and a dispenser/pipetting tip, dispensing or aspirating a volume of liquid through an exterior opening of the tip dependent on the flow of the system fluid, wherein controlling the flow and determining a flow time in dependence of the volume of (Continued)

liquid to be dispensed or aspirated, and controlling the magnetic valve is held open for the duration of the flow time.

25 Claims, 2 Drawing Sheets

(51) Int. Cl.
  *B01L 3/02* (2006.01)
  *G01F 11/12* (2006.01)
  *G01F 13/00* (2006.01)
(52) U.S. Cl.
  CPC ............ *G01F 11/12* (2013.01); *G01F 13/006* (2013.01); *B01L 2400/0666* (2013.01)
(58) Field of Classification Search
  CPC ...... G01F 11/12; G01F 11/029; G01F 13/006; H01F 2007/185; H01F 2007/1861; H01F 2007/1805; H01F 2007/1844; H01F 2007/1888

See application file for complete search history.

(56) References Cited

U.S. PATENT DOCUMENTS

| 5,574,617 | A | | 11/1996 | Shimanuki et al. |
| 5,741,554 | A | * | 4/1998 | Tisone .................... B05B 7/066 427/424 |
| 6,536,433 | B1 | * | 3/2003 | Cewers ............... A61M 16/205 128/205.24 |
| 8,376,313 | B2 | * | 2/2013 | Burke .................... E03C 1/057 327/517 |
| 2001/0017115 | A1 | | 8/2001 | Yoeda et al. |
| 2003/0207464 | A1 | | 11/2003 | Lemmo et al. |
| 2009/0015979 | A1 | | 1/2009 | Fukano et al. |
| 2010/0051841 | A1 | | 3/2010 | Herbert et al. |

\* cited by examiner

METHOD FOR CONTROLLING A MAGNETIC VALVE AND METHOD FOR DISPENSING OR ASPIRATING A VOLUME OF LIQUID AS WELL AS CORRESPONDING DISPENSER/PIPETTING APPARATUS

TECHNICAL FIELD

The present invention relates to a method for dispensing and/or aspirating a volume of liquid, in particular employing a method for controlling a magnetic valve, as well as to a corresponding dispenser/pipetting apparatus. Such an apparatus can be part of an automated liquid handling system as commonly used in medical, pharmaceutical and chemical laboratories, where large amounts of sample liquids need to be processed quickly and reliably. The described method for controlling a magnetic valve can for instance be employed to calibrate certain operation parameters of the magnetic valve, e.g. the time during which it is held open, or to monitor operation of the magnetic valve.

BACKGROUND OF THE INVENTION

Laboratories conducting large-scale sample analysis in the medical, pharmaceutical or chemical industries require systems for rapidly and reliably handling liquid volumes. Dispensing/pipetting of the sample liquids is at the core of these processes. Therefore, automated laboratory systems usually comprise one or more dispenser/pipetting apparatuses operating on liquid containers situated on a worktable. One or more robots (in particular robotic arms) may be used for operating on such a worktable surface.

These robots can carry liquid containers such as sample tubes or microplates. Specialized robots can also be implemented as robotic sample processors (RSP) comprising one or more dispenser/pipetting apparatuses for dispensing and aspirating liquids or merely for delivering liquids. A central processor or computer usually controls these systems. The primary advantage of such a system is complete hands-free operation. Accordingly, these systems can run for hours or days at a time with no human intervention.

In order to guarantee high-quality results such an automated liquid handling system must be able to handle predetermined volumes of liquid very precisely and consistently over time. A common technique for dispensing and aspirating liquids uses a system fluid such as air or a working liquid (which is less compressible) to apply a pressure from a pressure source to a dispenser/pipetting tube with an attached dispenser/pipetting tip to force e.g. a sample liquid or reagent out of the tip or to suck sample liquid or reagent into the tip. The volume of liquid which is dispensed or aspirated is dependent on the pressure and the amount of time during which the pressure is applied. Such a technique is therefore known as "time pressure dispensing(/aspirating)" (TPD). Usually, the pressure applied to the pipetting tube and therewith to the liquid to be dispensed/aspirated is controlled by a valve, such that by opening the valve a positive or negative pressure (relative to the current pressure in the pipetting tube, e.g. atmospheric pressure) is applied to the pipetting tube by enabling the system fluid to flow through the valve. Typically, magnetic valves are employed which comprise a solenoid coil and a mobile anchor forming a plunger, the plunger being moveable between a closed and an open position. The flow of the system fluid through the valve and consequently the volume of liquid which is dispensed or aspirated depends on the time it takes to open the valve, the open position of the plunger (e.g. fully or only partially open, which determines the passage size for the system fluid), the time during which the plunger is held in the open position and the time it takes to close the valve again. Consequently, depending on the valve's switching behaviour the amount of liquid being dispensed/aspirated by the dispenser/pipetting apparatus will be different and especially change over time. The "coefficient of variation" (commonly referred to as CV in the field of liquid handing, defined as the ratio of standard deviation of the volume of dispensed/aspirated liquid to the mean value of the volume of dispensed/aspirated liquid over time) in a liquid handling system will vary due to manufacturing tolerances, aging, mechanical wear, environmental influences such as temperature and humidity, operating conditions such as pressure, liquid properties and supply voltage, etc., and will be different for different dispenser/pipetting apparatuses of an RSP and usually change over time.

Hence, there exists a need for improved means for ensuring precise (e.g. in terms of CV) and accurate (e.g. in terms of deviation of the actually dispensed/aspirated volume of liquid from the intended target volume) handling of liquid volumes.

SUMMARY OF THE INVENTION

It is an object of the present invention to provide an improved method for controlling a magnetic valve. This object is reached by the steps pertaining to controlling the magnetic valve provided in claim 1.

Moreover, it is a further goal of the present invention to provide a method for adjusting or calibrating the behaviour of a magnetic valve and for monitoring the operation of a magnetic valve, respectively. This aim is addressed by claims 13 and 14, respectively, based on the proposed steps for controlling the magnetic valve.

Furthermore, it is also an object of the present invention to provide an improved method for dispending and/or aspirating a volume of liquid. This object is reached by the method according to claim 1.

It is a further goal of the present invention to provide a dispenser/pipetting apparatus capable of performing the proposed method for dispending and/or aspirating as well as an automated liquid handling system comprising the proposed apparatus, respectively. This aim is achieved by the apparatus and system according to claims 15 and 18, respectively.

Specific embodiments of the methods and apparatus according to the present invention are given in the dependent claims.

The present invention provides a method for controlling a magnetic valve, comprising a solenoid coil and a mobile anchor forming a plunger, wherein the plunger is moveable between a closed position and an open position, the method comprising the steps of:
  applying an opening current as a driving current to the solenoid coil to drive the plunger from the closed position to the open position;
  measuring a capacitance at the magnetic valve;
  determining a position of the plunger based on the measured capacitance.

The applied opening current may then be adjusted dependent on the position of the plunger determined based on the measured capacitance.

In an embodiment the method further comprises the step of:
  holding the plunger at a predetermined position, in particular at the open position, for a predetermined holding time by applying a holding current as the driving current to the solenoid coil, the holding current in particular having a smaller amplitude than the opening current.

The applied holding current may then be adjusted dependent on the position of the plunger determined based on the measured capacitance.

In an embodiment the method further comprises the step of:
applying a closing current as the driving current to the solenoid coil to drive the plunger from the open position to the closed position, the closing current in particular having an opposite polarity to the opening current.

The applied closing current may then be adjusted dependent on the position of the plunger determined based on the measured capacitance.

Often a closing spring acts on the mobile anchor forcing the plunger towards the closed position when no current is applied. However, for fast acting valves with switching times of less than a millisecond, as especially employed in dispensing applications, no closing spring is employed but instead a closing current is applied as specified above. In certain applications a closing spring will be used and additionally a closing current may be applied, for instance to be able to control the closing behaviour, such as the closing speed, and for example decelerate the plunger before reaching the closed position in order to avoid strong impacts and thus increase the durability of the valve.

In a further embodiment of the method the magnetic valve further comprises a stationary anchor, in particular coaxially arranged adjacent to the mobile anchor, electrically connected to a metallic housing of the magnetic valve, wherein the solenoid coil and the housing are connected to a capacitance measurement unit for measuring the capacitance.

In a further embodiment of the method the step of measuring the capacitance comprises the step of:
applying a measuring voltage to the solenoid coil, wherein the measuring voltage is in particular applied as an alternating current (AC) signal, a pseudo random noise (PRN) signal or an exponential function shaped signal.

In a further embodiment of the method the measuring voltage has a different frequency, in particular a higher frequency, than the driving current, the frequency of the measuring voltage in particular being higher than 1 kHz, more particularly higher than 10 kHz, even more particularly between 100 kHz and 1 MHz. Typically, the opening, closing and holding current/voltage is a DC (direct current) signal.

In a further embodiment of the method the measuring voltage has a different amplitude, in particular a lower amplitude, than a driving voltage associated with the driving current.

For instance, the opening and closing voltage equals 24 VDC, the holding voltage equals 6 VDC and the measuring voltage is below 1 VAC, such as 50 mVAC.

In a further embodiment of the method the measuring voltage is superimposed on the driving voltage associated with the driving current.

In a further embodiment of the method the driving current is applied as a pulse width modulated (PWM) signal having a duty cycle consisting of an active phase and a passive phase, wherein the driving current is zero during the passive phase.

Alternatively, the driving current may be applied as a pulse amplitude modulated (PAM) signal.

In a further embodiment of the method the measuring voltage is only present during the passive phase of the duty cycle of the pulse width modulated signal.

In a further embodiment the method further comprises the step of:
adjusting the driving current, in particular at least one of the opening current, the holding current and the closing current, in particular the amplitude, more particularly a pulse width of the pulse width modulated signal, in dependence of the position of the plunger.

In a further embodiment the method further comprises at least one of the following steps:
determining an opening time of the magnetic valve as a time interval between the plunger leaving the closed position and reaching the open position;
determining a closing time of the magnetic valve as a time interval between the plunger leaving the open position and reaching the closed position, and further comprising at least one of the following steps:
adjusting the driving current, in particular at least one of the opening current, the holding current and the closing current, in particular the amplitude, more particularly a pulse width of the pulse width modulated signal, in dependence of the opening time and/or the closing time;
providing a fault indication in dependence of the opening time and/or the closing time, in particular when the opening time exceeds a first predefined value and/or when the closing time exceeds a second predefined value.

Furthermore, the present invention is directed to a use of the last-mentioned method to adjust or calibrate a holding time of the magnetic valve in dependence of the determined opening time and/or closing time.

Furthermore, the present invention is directed to a use of the method for controlling a magnetic valve to monitor operation of the magnetic valve based on the position of the plunger.

Furthermore, the present invention is directed to a method for dispensing or aspirating a volume of liquid comprising the steps of:
applying a pressure from a pressure source to a system fluid;
controlling a flow of the system fluid by means of a magnetic valve located between the pressure source and a dispenser or pipetting tip;
dispensing or aspirating the volume of liquid through an exterior opening of the tip dependent on the flow of the system fluid, the system fluid being in fluid communication with the liquid to be dispensed or aspirated,
wherein controlling the flow comprises:
determining a flow time in dependence of the volume of liquid to be dispensed or aspirated;
controlling the magnetic valve according to the above-proposed method for controlling a magnetic valve, wherein the predetermined holding time is set to the flow time.

It is to be noted that in the case of a dispenser the liquid to be dispensed can itself be used as the system fluid. Consequently, the system fluid and the liquid to be dispensed are then to be considered as one and the same.

In an embodiment of the method a restrictor, such as a capillary, for restricting the flow is interconnected between the pressure source and the tip, the restrictor in particular having a flow resistance which is at least twice that of the exterior opening of the tip.

Furthermore, the present invention is directed to a dispenser/pipetting apparatus comprising:
- a pressure source adapted to apply a pressure to a system fluid, the system fluid being in fluid communication with a liquid to be dispensed or aspirated;
- a magnetic valve, comprising a solenoid coil and a mobile anchor forming a plunger, wherein the plunger is moveable between a closed position and an open position;
- a dispenser or pipetting tip with an exterior opening through which the liquid can be dispensed or aspirated;
- a capacitance measurement unit adapted to measure a capacitance at the magnetic valve; and
- a control unit adapted to control a flow of the system fluid by means of the magnetic valve, which is located between the pressure source and the tip, wherein the control unit is adapted to:
- determine a flow time in dependence of a volume of liquid to be dispensed or aspirated; and
- control the magnetic valve according to the above-proposed method for controlling a magnetic valve, wherein the predetermined holding time is set to the flow time.

In an embodiment of the apparatus the magnetic valve further comprises a stationary anchor, in particular coaxially arranged adjacent to the mobile anchor, electrically connected to a metallic housing of the magnetic valve, wherein the solenoid coil and the housing are connected to the capacitance measurement unit for measuring the capacitance.

In a further embodiment the apparatus further comprises a restrictor, such as a capillary, adapted to restrict the flow and interconnected between the pressure source and the tip, the restrictor in particular having a flow resistance which is at least twice that of the exterior opening of the tip.

Furthermore, the present invention is directed to an automated liquid handling system comprising the above-mentioned apparatus.

It is specifically pointed out that combinations of the embodiments described above can result in even further, more specific embodiments.

BRIEF DESCRIPTION OF THE DRAWINGS

The present invention is further explained below by means of non-limiting specific embodiments and with reference to the accompanying drawings, which show the following.

DETAILED DESCRIPTION OF THE INVENTION

Figure 1:
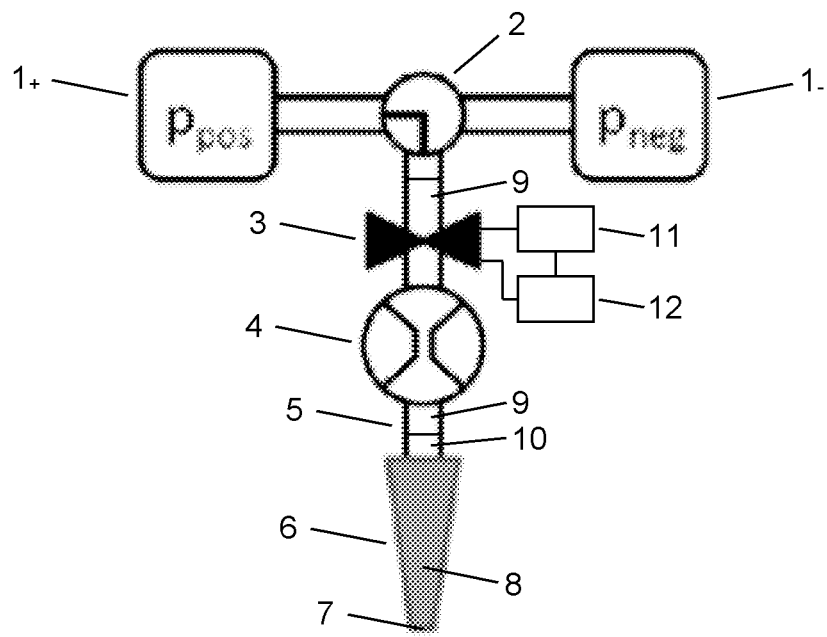
FIG. 1 a dispenser/pipetting apparatus according to the present invention.

FIG. 1 depicts a dispenser/pipetting apparatus according to the present invention. A positive and a negative pressure source $1_+$, $1_-$ selectable by a pressure switching means 2 apply a pressure to a system fluid 9. Instead of employing a separate positive and a negative pressure source $1_+$, $1_-$ a single pressure source with an adjustable pressure, such as a (plunger) pump, may be used. The system fluid 9 is in fluid communication with a liquid 8 to be dispensed or aspirated via a pipetting/dispenser tip 6, which is typically attached to a pipetting tube 5. In case the system fluid 9 is not a gas, such as air, the liquid 8 is separated from the system fluid 9 by air 10 (or another gas) in order to avoid contact (and therewith e.g. contamination of the liquid 8) with the system fluid 9. In the case of a dispenser the liquid 8 to be dispensed can itself be used as the system fluid 9 (and the interjacent air 10 is not necessary). A magnetic valve 3 is located in the path of the system fluid 9 in order to regulate its flow. Furthermore, a restriction 4, such as a capillary, may be located between the magnetic valve 3 and the tip 6. However, the restriction 4 may also be arranged between the pressure source $1_+$, $1_-$ and the magnetic valve 3, or may even form part of the magnetic valve 3, e.g. it may be integrated into the magnetic valve 3. The purpose of the restrictor 4 is to restrict the flow of the system fluid 9 by exerting a certain desired flow resistance, whereby the flow resistance is typically chosen to be at least double that of the exterior opening 7 of the tip 6.

In case liquid 8 is to be dispensed, a higher pressure than the pressure currently being exerted on the liquid 8 (e.g. above atmospheric pressure) is applied to the system fluid 9, i.e. the positive pressure source $1_+$ is selected by the pressure switching means 2. The pressure switching means 2 may comprise two valves, one at the output of the positive pressure source $1_+$, which is open when dispensing, and one at the output of the negative pressure source $1_-$, which is closed when dispensing. This higher pressure becomes effective on the liquid 8 to be dispensed from the tip 6 as soon as the magnetic valve 3 is opened and stays effective until the magnetic valve 3 is closed again. The amount (i.e. the volume) of liquid 8 which is dispensed is dependent on the level of the pressure being applied and the length of time during which the pressure is applied, i.e. the time during which the magnetic valve 3 is open. If the magnetic valve 3 opens and closes essentially instantaneously (i.e. the opening and closing time are negligible), the holding time $T_h$ during which the magnetic valve 3 is held open determines the volume of liquid 8 which is dispensed if the pressure is maintained at a constant level. Therefore, given the amount of liquid 8 to be dispensed the control unit 12 determines the necessary holding time $T_h$ for dispensing the desired volume of liquid 8, and controls the magnetic valve 3 accordingly, as will be described in more detail below.

In case liquid 8 is to be aspirated, a lower pressure than the pressure currently being exerted on the liquid 8 (e.g. below atmospheric pressure) is applied to the system fluid 9, i.e. the negative pressure source $1_-$ is selected by the pressure switching means 2, e.g. the valve at the output of the negative pressure source $1_-$ is opened and the one at the output of the positive pressure source $1_+$ is closed. Again, this lower pressure becomes effective on the liquid 8 to be aspirated into the tip 6 as soon as the magnetic valve 3 is opened and stays effective until the magnetic valve 3 is closed again.

As previously indicated the amount/volume of liquid 8 dispensed/aspirated varies based on manufacturing tolerances, aging and mechanical wear of the magnetic valve as well as environmental influences such as temperature and humidity, operating conditions such as pressure, liquid properties and supply voltage. All these influences can lead to changes of the switching behaviour of the magnetic valve 3, e.g. the opening and closing times are increased, and therefore are no longer negligible (or at least take on other values than the initial ones over time). Furthermore, the flow of the system fluid 9 decreases over time, for instance when the magnetic valve 3 is hindered from fully opening, e.g. due to clogging. This will reduce the amount/volume of liquid 8 that is dispensed/aspirated during a fixed holding time $T_h$ determined by the control unit 12 and used to control the magnetic valve 3. Consequently, the holding time $T_h$ should be adjusted (or calibrated) based on an appropriate feedback signal, as will be explained in the following.

Figure 2:
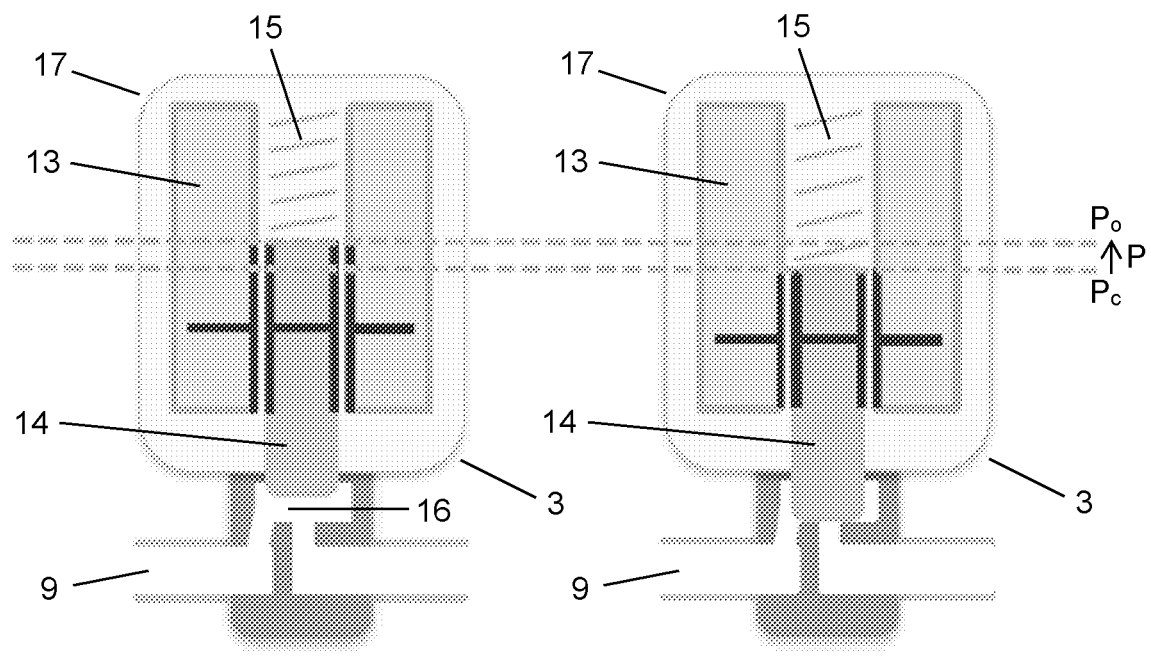
FIG. 2 a schematic representation of an embodiment of a magnetic valve according to the present invention
a) in an open position, and
b) in a closed position.

FIG. 2 schematically shows a magnetic valve 3 comprising a solenoid coil 13 and a mobile anchor forming a plunger 14. In order to open the magnetic valve 3 an opening current is applied as a driving current to the solenoid coil 13, which drives the plunger 14 from its closed position $P_c$ (shown in FIG. 2 *b*)) to an open position $P_o$ (shown in FIG. 2 *a*)). As soon as the magnetic valve 3 is open system fluid 9 may flow through the passage 16 of the magnetic valve 3, thereby transferring the pressure from the positive or negative pressure source $1_+$, $1_-$ to the liquid 8 to be dispensed or aspirated.

Typically, a closing spring 15 is arranged at the mobile anchor to apply a closing force that pushes the plunger 14 back towards the closed position $P_c$. Therefore, once the magnetic valve 3 has been opened a holding current needs to be applied as a driving current to the solenoid coil 13 to counteract the closing force of the closing spring 15. This holding current is maintained during the holding time $T_h$ determined by the control unit 12 such that the desired amount/volume of liquid 8 is dispensed/aspirated. Once the holding time $T_h$ has passed the magnetic valve 3 is closed again. This can simply be achieved by no longer driving the solenoid coil 13 and letting the closing spring 15 close the magnetic valve 3, or alternatively when no closing spring 15 is employed applying a closing current having the opposite polarity to the opening and holding current as a driving current to the solenoid coil 13 such that the plunger 14 is moved to the closed position $P_c$ again. A closing current can also be employed together with the closing spring 15, for example to decelerate (i.e. apply a breaking action on) the plunger 14 before reaching the closed position $P_c$ in order to avoid strong impacts and thus increase the working lifespan of the magnetic valve 3.

In an open loop control system the driving currents are preset to certain levels for opening, holding open and closing the magnetic valve 3. Likewise, the holding time $T_h$ is preselected depending on the desired amount of liquid 8 to be dispensed (e.g. based on a lookup table).

To allow closed loop control of the magnetic valve 3 a feedback signal must be available. This is made possible by the present invention by measuring a capacitance at/of the magnetic valve 3. The measured capacitance changes depending on the position P of the plunger 14 as indicated by the large capacitor illustrated in FIG. 2 *a*) when the magnetic valve 3 is open and the mobile anchor is largely retracted within the solenoid coil 13 (plunger 14 in the open position $P_o$) and the smaller capacitor illustrated in FIG. 2 *b*) when the magnetic valve 3 is closed and the mobile anchor is less retracted within the solenoid coil 13 (plunger 14 in the closed position $P_c$).

When the magnetic valve 3 for instance comprises a stationary anchor that is coaxially arranged adjacent to the mobile anchor and electrically connected to a metallic housing 17 of the magnetic valve 3, the solenoid coil 13 and the housing 17 can be connected to a capacitance measurement unit 11 for measuring the capacitance. Measuring the capacitance can be achieved by applying a measuring voltage to the solenoid coil 13 in addition to the driving current, e.g. by superimposing the measuring signal onto the driving signal. Thereby, the measuring signal may be an alternating current signal, a pseudo random noise signal or an exponential function shaped signal. Furthermore, the measuring signal and the driving signal may have different frequencies so that they can be easily separated from one another, e.g. by means of a highpass filter.

To achieve closed loop control of the magnetic valve 3 the applied driving current can be adjusted dependent on the position P of the plunger determined based on the measured capacitance. This allows to achieve targeted opening, holding and closing times $T_o$, $T_h$, $T_c$ despite manufacturing tolerances, aging and mechanical wear of the magnetic valve as well as environmental influences such as temperature and humidity, operating conditions such as pressure, liquid properties and supply voltage.

Figure 3:
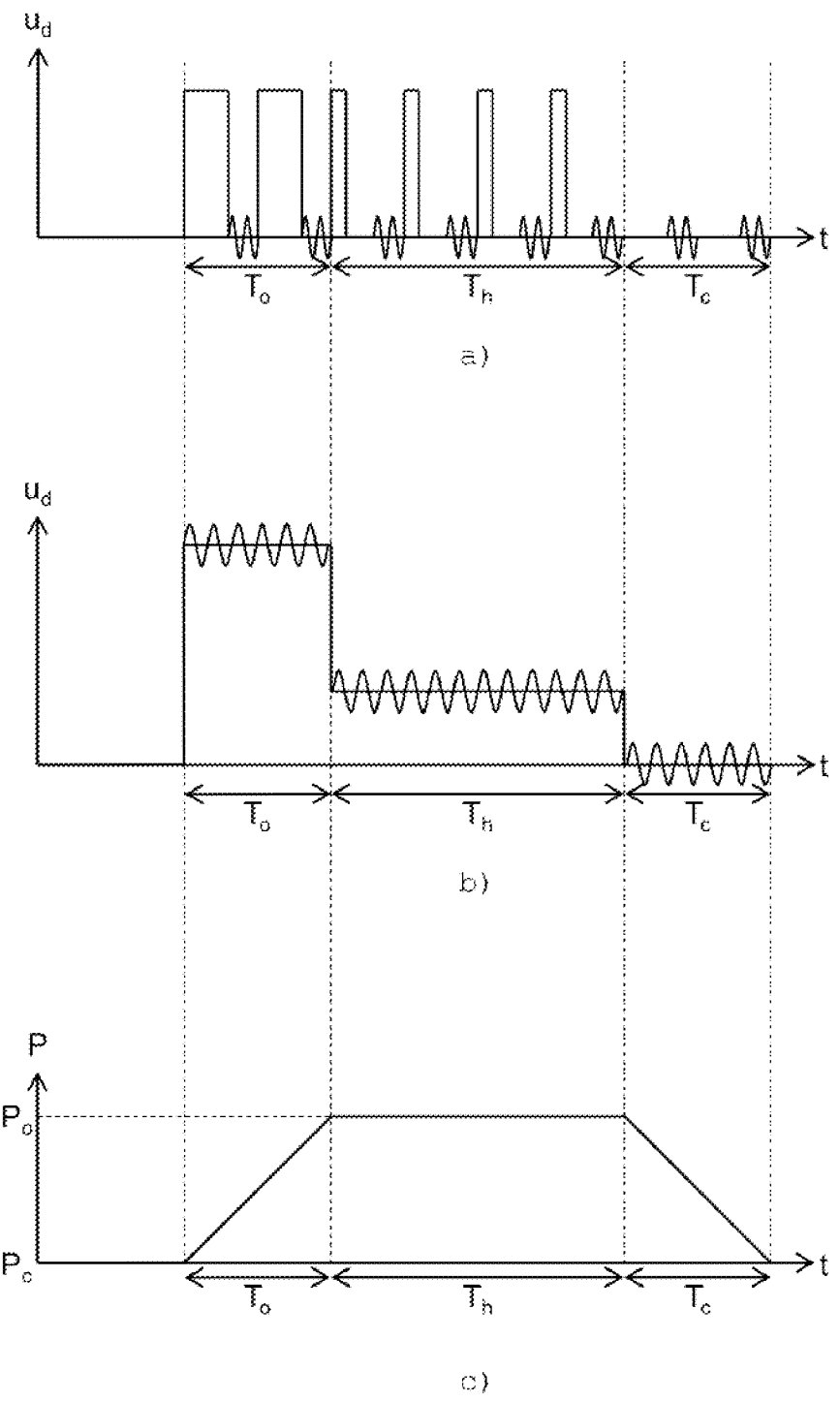
FIG. 3 exemplary graphs of the progression over time of:
a) a driving voltage applied to the solenoid coil of a magnetic valve as a PWM signal together with an interleaved measuring voltage,
b) a driving voltage applied to the solenoid coil as a PAM signal together with a superimposed measuring voltage, and
c) the position of a plunger of a magnetic valve resulting from applying the drive voltage to the solenoid coil.

FIG. 3 displays graphs of two different examples for driving the magnetic valve 3. FIG. 3 *a*) shows a driving voltage $u_d$ applied as a pulse width modulated (PWM) signal having a duty cycle consisting of an active phase ($u_d$>0 VDC) and a passive phase ($u_d$=0 VDC). In this example the measuring voltage in the form of a sinusoidal signal is only present during the passive phase of the duty cycle of the PWM signal, i.e. the driving and measuring signals are interleaved. In the alternative example shown in FIG. 3 *b*) the driving voltage $u_d$ is applied as a pulse amplitude modulated (PAM) signal. In this example the measuring voltage in the form of a sinusoidal signal is superimposed on the PAM driving signal and continuously present. The graph depicted in FIG. 3 *c*) shows the position P of the plunger 14 over time dependent on the driving voltage $u_d$. During the opening time $T_o$ the opening voltage is applied to the solenoid coil 13 (e.g. for two duty cycles of the PWM signal in FIG. 3 *a*)) to drive the plunger 14 from the closed position $P_c$ to the open position $P_o$. Subsequently, the plunger 14 is held in the open position $P_o$ by applying the holding voltage to the solenoid coil 13 during the holding time $T_h$ (e.g. for four duty cycles of the PWM signal in FIG. 3 *a*)). Finally, the plunger 14 is forced back to the closed position $P_c$, in this case by setting the closing voltage to 0 V during the closing time $T_c$ (e.g. for two duty cycles of the PWM signal in FIG. 3 *a*)) and leaving it to the closing force of the closing spring 15 to retract the plunger 14. The desired amount of liquid 8 to be dispensed or aspirated can then be precisely controlled by the control unit 12 by appropriately adjusting the driving voltage $u_d$ dependent on the position of the plunger 14 determined based on the capacitance measured at the magnetic valve 3.

LIST OF REFERENCE SYMBOLS $1_+$ positive pressure source
$1_-$ negative pressure source
2 pressure switching means
3 magnetic valve
4 restriction, e.g. capillary
5 pipetting tube
6 dispenser/pipetting tip
7 tip opening
8 liquid
9 system fluid
10 air
11 capacitance measurement unit
12 control unit
13 solenoid coil 14 plunger (mobile anchor)
15 closing spring
16 passage
17 housing
$P_c$ position of the plunger
$P_o$ closed position of the plunger
t time
$T_c$ closing time
$T_h$ holding time
$T_o$ opening time
$u_d$ driving voltage

The invention claimed is:

1. A method for controlling a magnetic valve (3), comprising a solenoid coil (13) and a mobile anchor forming a plunger (14), wherein the plunger (14) is moveable between a closed position ($P_c$) and an open position ($P_o$), the method comprising the steps of:
applying an opening current as a driving current to the solenoid coil (13) to drive the plunger (14) from the closed position ($P_c$) to the open position ($P_o$);
measuring a capacitance of the magnetic valve (3) by applying a measuring voltage to the solenoid coil (13);
determining a position (P) of the plunger (14) based on the capacitance measured of the magnetic valve (3).

2. The method of claim 1, further comprising the step of:
holding the plunger (14) at a predetermined position (P) for a predetermined holding time ($T_h$) by applying a holding current as the driving current to the solenoid coil (13), the holding current having a smaller amplitude than the opening current.

3. The method of claim 1, further comprising the step of:
applying a closing current as the driving current to the solenoid coil (13) to drive the plunger (14) from the open position ($P_o$) to the closed position ($P_c$), the closing current having an opposite polarity to the opening current.

4. The method of claim 1, wherein the magnetic valve (3) further comprises a stationary anchor coaxially arranged adjacent to the mobile anchor, electrically connected to a metallic housing (17) of the magnetic valve (3), wherein the solenoid coil (13) and the housing (17) are connected to a capacitance measurement unit (11) for measuring the capacitance.

5. The method of claim 1,
wherein the measuring voltage is applied as an alternating current signal, a pseudo random noise signal or an exponential function shaped signal.

6. The method of claim 5, wherein the measuring voltage has a different frequency than the driving current.

7. The method of claim 6, wherein the measuring voltage has a different amplitude than a driving voltage associated with the driving current.

8. The method of claim 5, wherein the measuring voltage is superimposed on the driving voltage associated with the driving current.

9. The method of claim 1, wherein the driving current is applied as a pulse width modulated signal having a duty cycle consisting of an active phase and a passive phase, wherein the driving current is zero during the passive phase.

10. The method of claim 9, wherein the measuring voltage is only present during the passive phase of the duty cycle of the pulse width modulated signal.

11. The method of claim 1, further comprising the step of: adjusting the driving current in dependence of the position (P) of the plunger (14).

12. The method of claim 1, further comprising at least one of the following steps:
determining an opening time ($T_o$) of the magnetic valve (3) as a time interval between the plunger (14) leaving the closed position ($P_c$) and reaching the open position ($P_o$);
determining a closing time ($T_c$) of the magnetic valve (3) as a time interval between the plunger (14) leaving the open position ($P_o$) and reaching the closed position ($P_c$),
and further comprising at least one of the following steps:
adjusting the driving current and the closing current in dependence of the opening time ($T_o$) and/or the closing time ($T_c$);
providing a fault indication in dependence of the opening time ($T_o$) and/or the closing time ($T_c$).

13. The method according to claim 12, comprising adjusting or calibrating a holding time ($T_h$) of the magnetic valve (3) in dependence of the determined opening time ($T_o$) and/or closing time ($T_c$).

14. The method according to claim 1, comprising monitoring an operation of the magnetic valve (3) based on the position (P) of the plunger (14).

15. A method for dispensing or aspirating a volume of liquid (8) comprising the steps of:
applying a pressure from a pressure source ($1_+$, $1_-$) to a system fluid (9);
controlling a flow of the system fluid (9) by means of a magnetic valve (3) located between the pressure source ($1_+$, $1_-$) and a tip (6) of a dispenser or pipette;
dispensing or aspirating the volume of liquid (8) through an exterior opening (7) of the tip (6) dependent on the flow of the system fluid (9), the system fluid (9) being in fluid communication with the liquid (8) to be dispensed or aspirated,
wherein controlling the flow comprises:
determining a flow time in dependence of the volume of liquid (8) to be dispensed or aspirated;
controlling the magnetic valve (3) by applying an opening current as a driving current to a solenoid coil (13) to drive a plunger (14) from a closed position ($P_c$) to an open position ($P_o$), measuring a capacitance of the magnetic valve (3) by applying a measuring voltage to the solenoid coil (13), determining a position (P) of the plunger (14) based on the measured capacitance, and holding the plunger (14) at a predetermined position (P) for a predetermined holding time ($T_h$) by applying a holding current as the driving current to the solenoid coil (13), the holding current having a smaller amplitude than the opening current,
wherein—the predetermined holding time ($T_h$) is set to the flow time.

16. The method of claim 15, wherein a restrictor (4), such as a capillary, for restricting the flow is interconnected between the pressure source ($1_+$, $1_-$) and the tip (6), the restrictor (4) having a flow resistance which is at least twice that of the exterior opening (7) of the tip (6).

17. A dispenser/pipetting apparatus comprising:
a pressure source ($1_+$, $1_-$) adapted to apply a pressure to a system fluid (9), the system fluid (9) being in fluid communication with a liquid (8) to be dispensed or aspirated;
a magnetic valve (3); comprising a solenoid coil (13) and a mobile anchor forming a plunger (14), wherein the plunger (14) is moveable between a closed position ($P_c$) and an open position ($P_c$);
a dispenser or pipetting tip (6) with an exterior opening (7) through which the liquid (8) can be dispensed or aspirated;

a capacitance measurement unit (11) adapted to measure a capacitance of the magnetic valve (3); and a control unit (12) adapted to control a flow of the system fluid (9) by means of the magnetic valve (3), which is located between the pressure source ($1_+$, $1_-$) and the tip (6), wherein the control unit (12) is adapted to:

determine a flow time in dependence of a volume of liquid (8) to be dispensed or aspirated; and control the magnetic valve (3) by applying an opening current as a driving current to the solenoid coil (13) to drive the plunger (14) from the closed position ($P_c$) to the open position ($P_o$), measuring a capacitance of the magnetic valve (3) by applying a measuring voltage to the solenoid coil (13), determining a position (P) of the plunger (14) based on the measured capacitance, and holding the plunger (14) at a predetermined position (P) for a predetermined holding time ($T_h$) by applying a holding current as the driving current to the solenoid coil (13), the holding current having a smaller amplitude than the opening current, wherein—the predetermined holding time ($T_h$) is set to the flow time.

18. The apparatus according to claim 17, wherein the magnetic valve (3) further comprises a stationary anchor coaxially arranged adjacent to the mobile anchor, electrically connected to a metallic housing (17) of the magnetic valve (3), wherein the solenoid coil (13) and the housing (17) are connected to the capacitance measurement unit (11) for measuring the capacitance.

19. The apparatus of claim 17, further comprising a restrictor (4) adapted to restrict the flow and interconnected between the pressure source ($1_+$, $1_-$) and the tip (6), the restrictor (4) having a flow resistance which is at least twice that of the exterior opening (7) of the tip (6).

20. An automated liquid handling system comprising the apparatus of claim 17.

21. The method of claim 6, wherein the frequency of the measuring voltage is higher than 1 kHz.

22. The method of claim 6, wherein the frequency of the measuring voltage is higher than 10 kHz.

23. The method of claim 6, wherein the frequency of the measuring voltage is between 100 kHz and 1 MHz.

24. The method of claim 11, wherein driving current is at least one of one of the opening current, the holding current and the closing current, and wherein the amplitude of the driving current is adjusted.

25. The method of claim 11, wherein the driving current is a pulse width modulated signal, and wherein a pulse width of the driving current is adjusted.

* * * * *